July 7, 1925.
H. E. BRANDT
SPRAYER
Filed Jan. 13, 1922
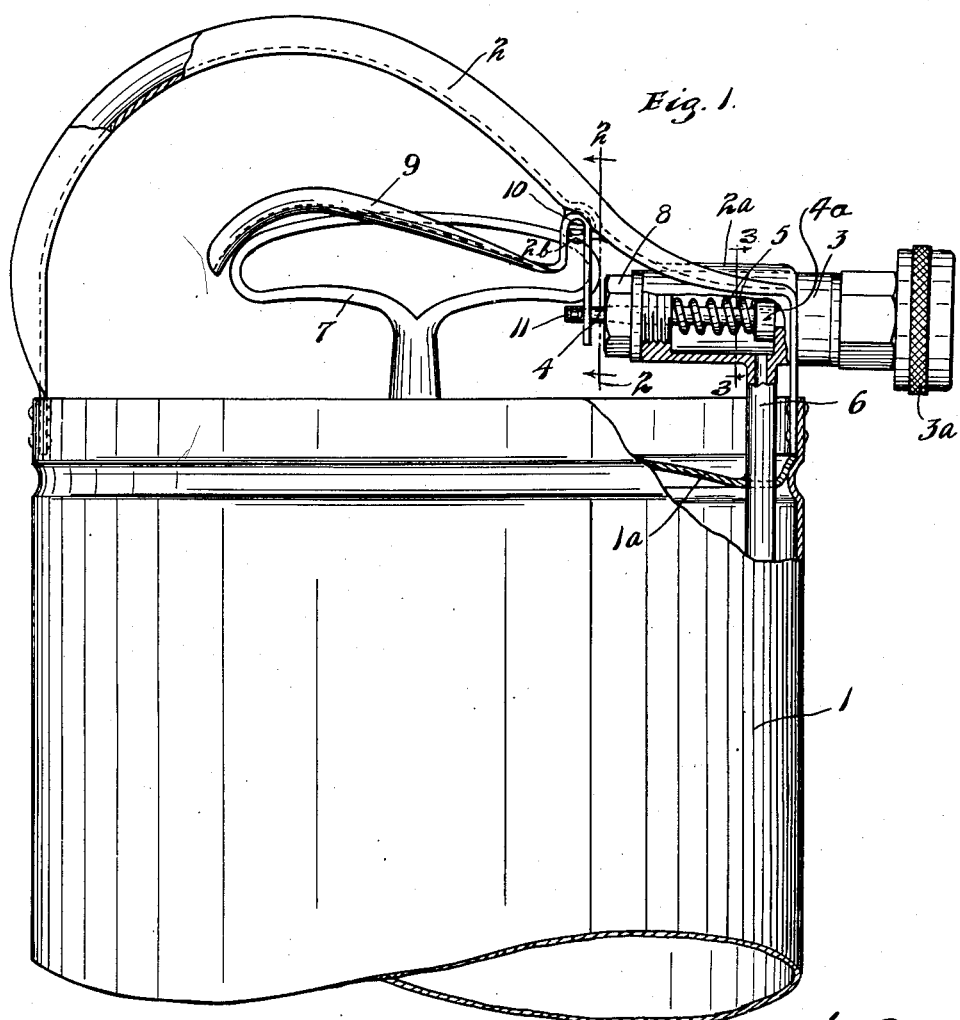
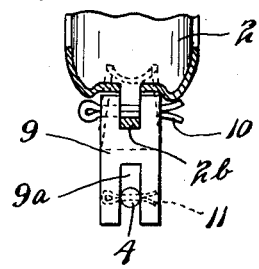
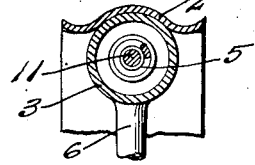
INVENTOR.
HENRY E. BRANDT.
BY HIS ATTORNEY.
James F. Williamson Patented July 7, 1925.

1,544,720

UNITED STATES PATENT OFFICE

HENRY E. BRANDT, OF NORTH ST. PAUL, MINNESOTA, ASSIGNOR TO DOBBINS MANUFACTURING COMPANY, OF NORTH ST. PAUL, MINNESOTA, A CORPORATION OF SOUTH DAKOTA.

SPRAYER.

Application filed January 13, 1922. Serial No. 528,947.

*To all whom it may concern:*

Be it known that I, HENRY E. BRANDT, a citizen of the United States, residing at North St. Paul, in the county of Ramsey and State of Minnesota, have invented certain new and useful Improvements in Sprayers; and I do hereby declare the following to be a full, clear, and exact description of the invention, such as will enable others skilled in the art to which it appertains to make and use the same.

This invention relates to a spraying device of the type used to spray vegetables, trees, etc. The invention is directed particularly to the construction of the supporting handle for the receptacle which is adapted to contain the spraying fluid and the handle which is used to control the spraying nozzle.

It is an object of this invention to provide a supporting handle for the said receptacle and to also provide a handle or lever for operating the spraying nozzle, the said lever or handle being disposed adjacent to and beneath the supporting handle, so that the sprayer can be held by the supporting handle with one hand and the fingers of said hand can, at the same time, manipulate and control the spraying nozzle.

It is a further object of the invention to locate the nozzle at the top of the receptacle and to have the same extending through the handle so that the spraying end thereof projects at one side of the handle and receptacle and the other end thereof from which projects the stem of the control valve is disposed on the inside of the supporting handle and in convenient relation to be connected to the control lever.

It is still another object of the invention to support the valve controlling lever handle by pivoting the same to the supporting handle by simple and efficient means.

These and further objects and advantages of the invention will fully appear from the following description made in connection with the accompanying drawings in which like reference characters refer to the same parts throughout the different views and in which—

Fig. 1 is a view in side elevation of the upper portion of the sprayer, a portion thereof being shown in section;

Fig. 2 is a vertical section taken on the line 2—2 of Fig. 1, as indicated by the arrows.

Fig. 3 is a vertical section taken on the line 3—3 of Fig. 1, as indicated by the arrows.

Referring to the drawings, a spraying device illustrated comprises a cylindrical receptacle 1 adapted to contain the spraying fluid. Only the upper portion of this receptacle is shown and the same is provided with a top 1ª above which the wall of the receptacle is continued to form a cylindrical flange. To the inside portion of this flange the ends of a supporting handle are riveted or otherwise suitably secured. This handle 2 is bent upwardly in a curved form, as shown on the drawings, the secured ends thereof extending vertically from the said flange for a short distance. The handle is preferably formed from a strip of sheet metal of crescent form in cross section forming a strong and comfortable shaped handle for supporting the sprayer. The spraying nozzle is designated generally as 3 and comprises the usual cylindrical and detachable threaded head 3ª shown as having a knurled portion extending therearound. This nozzle may be of any well known type now commonly used in sprayers, and the discharge of the fluid therefrom is controlled by a valve 4ª having a rearwardly projecting stem 4, the same being spring-pressed to closed position by a spring 5. As shown in Fig. 1, the front portion of the nozzle 3 projects at one side of the handle 2 and receptacle 1. The other end of the nozzle projects inwardly of the handle and the handle is formed with a semicylindrical portion 2ª partially fitting over the top of the nozzle 3 and preferably secured thereto. The nozzle thus extends through the handle 2. The nozzle is provided with a downwardly extending tube 6 which communicates with the interior thereof, said tube being continued down to the receptacle to a point near the bottom thereof, at which point the spraying fluid enters the tube to be sprayed out through the nozzle 3. The spraying fluid is forced out through the tube 6 and nozzle 3 by air pressure accumulated in the receptacle 1 by a suitable air pump, the handle 7 of which is shown at one side of the handle 2. The rear of the nozzle 3 is closed by a collar and nut 8 threaded thereinto through the end of which the stem 4 projects.

In order to conveniently operate the nozzle valve and to control the discharge of the spraying fluid therethrough a lever 9 is provided, the handle portion of which is curved approximately in parallelism with the bottom of the handle 2, this handle portion also being rounded or crescent shaped in cross-section. This handle lever 9 is disposed immediately under the handle 2 and has, at one end, a U-shaped portion extending over a pivot member 10 illustrated as being in the form of a split key. This pivot member extends through a downwardly bent lug 2$^b$ integral with the handle 2, the U-shaped portion of lever 9 being provided with a central slot to accommodate this lug. The end of lever 9 is extended downwardly on one side of the U-shaped portion and provided with a central slot 9$^a$ embracing the stem member 4 and said stem member is provided inwardly of said end and slot with a transversely extending member shown in the form of a split key 11.

With the structure described, it will be seen that the sprayer can be supported and held by handle 2 with one hand and the lever 9 can at the same time be manipulated conveniently by some of the fingers of said hand to control the spraying through the nozzle 3. One hand is, therefore, left free to manipulate the plant to be sprayed to bring the same into the desired position relative to the spray, or if desired, a sprayer can be held in each hand and conveniently manipulated. The rounded shape of the handle 2 and the handle portion of lever 9 render the same very comfortable so that the hand does not become tired with the holding thereof. It is, of course, evident that as the handle portion of lever 9 is pulled upwardly the stem 4 will be retracted and the spraying valve opened, permitting the spraying fluid to be discharged through nozzle 3.

The device is of simple construction and can be easily and inexpensively made. The structure when assembled is quite rugged and not apt to become disarranged or get out of repair. The efficiency of the device has been amply demonstrated in actual practice and in the use of such sprayers. It will, of course, be understood that various changes may be made in the form, details and proportions of the parts without departing from the scope of applicant's invention, which, generally stated, consists in the matter shown and described and set forth in the appended claims.

What is claimed is:

1. A sprayer comprising a receptacle adapted to contain a spraying fluid, a supporting handle for said receptacle secured at its ends to the top of said receptacle, one of said ends being disposed adjacent one side of said receptacle, a spraying nozzle directed laterally at the top of said receptacle, and adjacent said side thereof comprising a valve adapted to open and close said nozzle having an inwardly directed stem movable to operate said valve and open and close said nozzle, a discharge conduit for the sprayer connected to said nozzle and extending downwardly therefrom into said container through the end thereof, and a pivoted handle lever disposed under said supporting handle connected to said stem and having a handle portion projecting beneath said supporting handle in position to be grasped therewith whereby the device can be supported and the spraying controlled with one and the same hand.

2. A sprayer comprising a cylindrical receptacle adapted to contain the spraying fluid, a supporting handle secured at its ends to the top of said receptacle, one of said ends being disposed at one side of said receptacle, a nozzle projecting laterally from and carried by said handle beyond said side and having its axis substantially at right angles to the longitudinal axis of said receptacle comprising a valve adapted to open and close said nozzle, a discharge conduit for the sprayer connected to said nozzle adjacent said side of the receptacle and leading downwardly therein through one end thereof, a stem projecting from said nozzle inwardly to the inside of said handle movable to operate said valve and a handle lever connected to said stem and pivotally connected to said handle having its handle portion adapted to be grasped with said supporting handle to control the discharge of fluid through said nozzle.

3. The structure set forth in claim 2, said nozzle being secured to and passing through said handle.

4. The structure set forth in claim 2, said supporting handle being downwardly curved in cross section above said nozzle and fitting over the top thereof and being bent substantially at right angles to provide a vertical portion attached to said side of the receptacle.

5. In a sprayer, the combination with a receptacle adapted to contain the spraying fluid, an upwardly curved supporting handle secured at its ends to the sides of said receptacle at the top thereof, a valve controlled spray nozzle secured to and extending through the handle and having one end thereof projecting outwardly at one side of the handle, the other end of said nozzle projecting inwardly of said handle, a valve stem projecting from the inner end of said nozzle and a handle lever pivoted to the underside of said supporting handle and having a portion at one end connected to said stem, whereby the receptacle can be carried by the supporting handle with one hand and the handle lever moved to control the spraying from said nozzle with the same hand.

6. In a sprayer, a receptacle adapted to contain a spraying fluid, an upwardly curved supporting handle secured at its ends to the sides of said receptacle at the top thereof, a spraying nozzle directed laterally with its axis substantially at right angles to the longitudinal axis of said receptacle comprising a valve adapted to open and close said nozzle, and a lever pivoted to the underside of said supporting handle and connected to said valve, said lever having a handle portion curved in substantial parallelism to said supporting handle and adapted to be grasped with said supporting handle for controlling said valve.

7. In a sprayer, a receptacle adapted to contain the spraying fluid, an upwardly curved handle secured at its ends to the top of said receptacle at the sides thereof, and being crescent shaped in cross section with its convex side inwardly, a spraying nozzle extending laterally substantially at right angles to the longitudinal axis of said receptacle, a lever pivoted beneath said supporting handle having a handle portion and curved into approximately parallelism therewith, the handle portion of said lever also being crescent shaped in cross section with its convex side disposed inwardly and means connected to said lever for controlling said nozzle.

8. A spraying device comprising a receptacle, a supporting handle secured to the sides thereof adjacent its top, a nozzle extending laterally substantially at right angles to the longitudinal axis of said receptacle and at one side thereof adjacent its top, a valve stem projecting inwardly from said nozzle, and a handle lever pivoted beneath said supporting handle and connected to said stem, said handle lever being arranged to be grasped with said supporting handle by one hand to draw said stem inwardly and open said nozzle for the discharge of fluid.

9. A spraying device comprising a receptacle adapted to receive a spraying fluid, a supporting handle secured to the sides thereof adjacent its top, said handle having a convex undersurface in cross section, a nozzle adjacent the top of said receptacle carried by said handle and directed laterally at one side thereof with its axis substantially at right angles to the longitudinal axis of said receptacle, a lever beneath said supporting handle having a handle portion also convex in cross section on its lower side and constructed and arranged to be grasped with said supporting handle and means connected to said lever for controlling the discharge of fluid from said nozzle.

10. A spraying device comprising a cylindrical receptacle adapted to receiving the spraying fluid, a supporting handle secured to the top of said receptacle, a spraying nozzle adjacent the top of said receptacle directed laterally at right angles to the longitudinal axis of said receptacle and extending through said supporting handle and projecting beyond one side of said receptacle, and a lever connected to and beneath said supporting handle operatively connected to said nozzle and having a handle portion adapted to be grasped with said handle for controlling the discharge of fluid from said nozzle.

11. A sprayer having in combination, an upright cylindrical receptacle, a handle at the top end thereof with its ends adjacent the sides of said receptacle, a laterally directed nozzle projecting outwardly at one side of said handle comprising means for opening and closing said nozzle, a stem projecting inwardly at the inner side of said handle for controlling said means, and a lever handle beneath said handle and adapted to be grasped therewith connected to said stem to move the same and said means to open said nozzle, and means for moving said stem and said means outwardly to close said nozzle and to normally hold the nozzle closed.

12. The structure set forth in claim 11, said handles having portions extending in substantial parallelism, and said lever handle having one end extending substantially parallel to the axis of said receptacle for connection to said stem.

In testimony whereof I affix my signature.

HENRY E. BRANDT.